United States Patent [19]

Wood et al.

[11] Patent Number: 5,053,971
[45] Date of Patent: Oct. 1, 1991

[54] METHOD AND APPARATUS FOR EDGING AN OPTICAL LENS

[75] Inventors: Kenneth O. Wood, Stafford Springs; David J. Logan, Glastonbury, both of Conn.

[73] Assignee: Gerber Optical, Inc., South Windsor, Conn.

[21] Appl. No.: 400,522

[22] Filed: Aug. 30, 1989

[51] Int. Cl.⁵ .......................... G06F 15/46; B24B 7/00
[52] U.S. Cl. .................................. 364/474.06; 33/505; 33/507; 51/101 LG; 51/165.71; 51/284 E
[58] Field of Search .......................... 364/474.06, 473; 51/284 E, 101 LG, 105 LG, 106 LG, 165.71, 165.72; 351/177; 33/28, 200, 503, 504, 505, 507

[56] References Cited

U.S. PATENT DOCUMENTS

| 4,656,590 | 4/1987 | Ace | 364/474.06 |
| 4,711,035 | 12/1987 | Logan et al. | 33/200 |
| 4,781,452 | 11/1988 | Ace | 364/474.06 |
| 4,912,880 | 4/1990 | Haddock et al. | 51/284 E X |

Primary Examiner—Joseph Ruggiero
Attorney, Agent, or Firm—McCormick, Paulding & Huber

[57] ABSTRACT

A three axis, computer controlled apparatus for edging optical lenses maps the surfaces of a lens blank along a path defining the shape of the lens to be cut from the lens blank and from which mapping a computer controlled cutting algorithm directs the movement of the lens in the R, Z and theta axes direction. The apparatus provides rough cuts, finished cuts and automatic placement of bevels and grooves along the edge of the lens with minimal operator intervention.

20 Claims, 7 Drawing Sheets

METHOD AND APPARATUS FOR EDGING AN OPTICAL LENS

BACKGROUND OF THE INVENTION

The present invention relates generally to optical lens edging machines and deals more specifically with a method and associated computer controlled, patternless edging machine for optical lenses of the type used in spectacles.

Edging machines are generally well known in the art and generally utilize a lens pattern in conjunction with a cutter and a follower mechanism to edge the optical lens blank to the shape and size of the pattern. Often, several cutting and grinding cycles are necessary to produce an accurately sized and shaped optical lens. In addition, bevel placement requires considerable operator intervention to locate the lens edge and the bevel cutter to obtain proper bevel positioning.

It is desirable therefore to provide a lens edging machine that accurately positions the lens edge in the bevel cutter without operator intervention. It is further desirable to provide a dry edge grinding machine that operates without patterns or mechanical followers and that is relatively easy to use thereby providing a high throughput. It is also desirable that all cutting and edging features be provided from a multi-insert cutter for accomplishing roughing, bevel, hide-a-bevel, rimless and pin bevel cutting and grinding operations while providing a very smooth and excellent surface finish.

It is an object therefore of the present invention to provide a lens edging machine that generally overcomes the problems and limitations associated with prior edgers by including a multi-insert cutter, patternless operation, automatic bevel placement and automatic size control for edging lens for spectacles.

SUMMARY OF THE INVENTION

In accordance with the present invention, a three axis, computer controlled lens edging apparatus for use with optical lens blanks is presented. The apparatus provides a lens having the size and shape of a lens opening in an associated eyeglass frame in accordance with a plurality of data points collectively representative of the size and shape of the lens opening. A lens blank is chucked and rotated at a chucking station and relative movement between the chucked lens blank and a multi-insert cutter edges the lens in accordance with one or more edging operations to produce a finished lens. The edging operations are selectable and include beveling, pin beveling grooving and rimless edging.

In another aspect of the invention, the front and rear surfaces of the lens blank are mapped and this information is used to determine and locate the bevel location and placement and to detect unusual problems such as a lens blank being too small, too thin, or too thick for the lens size and shape to be cut and edged.

DETAILED DESCRIPTION OF PREFERRED EMBODIMENTS

Figure 1:
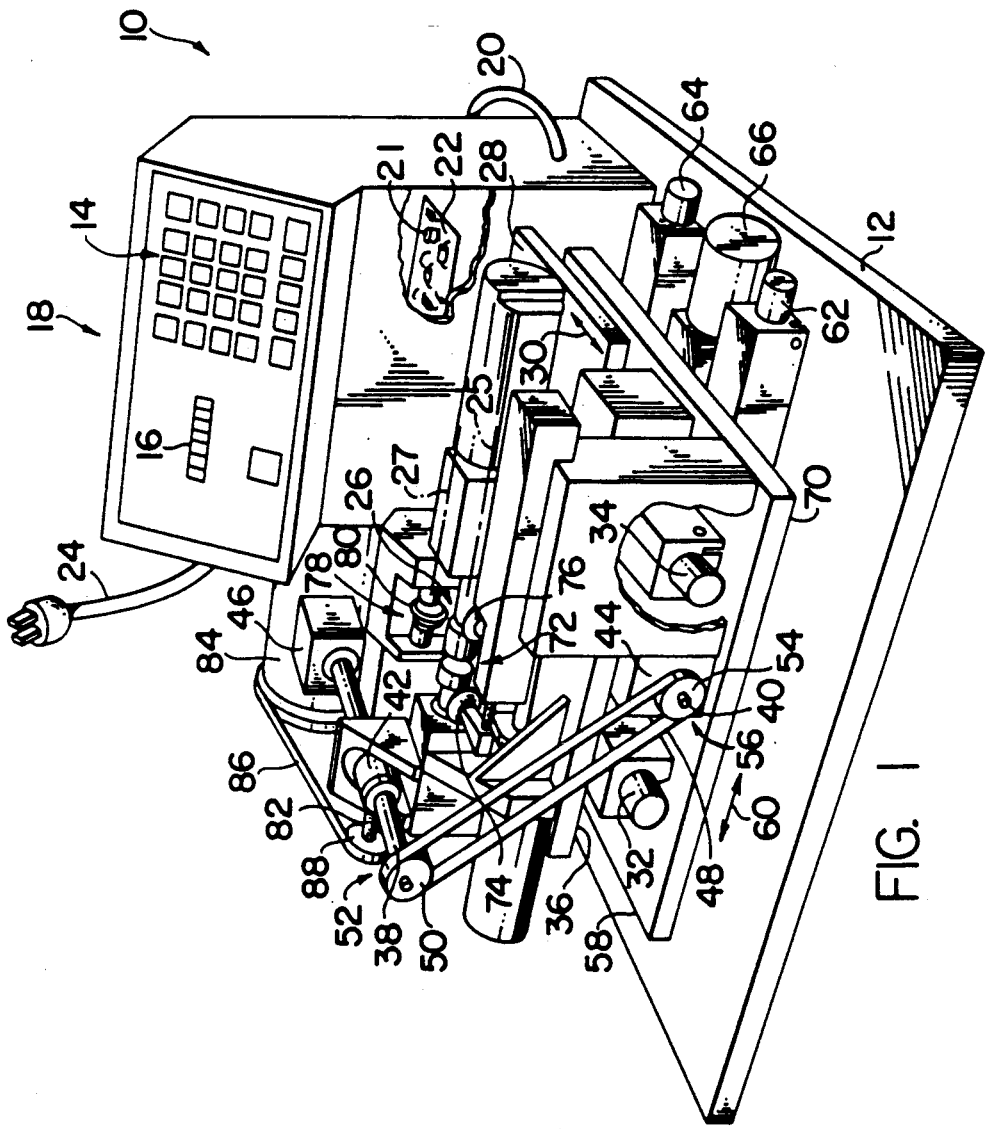
FIG. 1 is a schematic illustration showing one embodiment of the lens edging apparatus embodying the present invention.

Turning now to the drawings and considering the invention in great detail, a lens edging apparatus embodying the present invention is illustrated in FIG. 1 and is generally designated 10. The apparatus 10 is generally located within a protective cover to prevent potential injury to an operator; however, the cover is removable and is not illustrated in FIG. 1. The apparatus 10 is built on a base generally designated 12 and includes a membrane keyboard 14 for selecting the various functions of the edge grinding apparatus as described below and for inputting information into the edger. A liquid crystal display (LCD) 16 is used for displaying alphanumeric messages, instructions and other information relative to the operation of the apparatus. The keyboard 14 and display 16 are mounted and arranged such that the display and keyboard are visible to and accessible by an operator when the cover is in place.

The keyboard 14 and display 16 are part of a control entry module generally designated 18 which is attached to the base 12. The keyboard 14 and display 16 are connected to electronic circuitry contained within the apparatus 10 via a multiple wire electrical conductor 20 and which conductor couples the keyboard 14 and display 16 to electronic circuit components contained on a printed circuit board 22. A microprocessor or controller 21 is contained on the circuit board 22 along with the electronic circuitry necessary to control the operation of the lens edging apparatus 10. The controller 21 is programmed with an instruction set to carry out the cutting, edging, finishing and other operations of the apparatus 10. The apparatus 10 receives electrical power through a line cord 24 which is used to couple commercial AC power to the apparatus in a conventional, well known manner.

It will be recognized that although the electronic circuitry is shown for illustrative purposes located on the printed circuit board 22 in FIG. 1, in actuality, the electronic circuitry is distributed throughout the apparatus 10 and where necessary is enclosed and protected from damage due to the cutting equipment and/or other contaminants that may be present during the cutting and grinding process. The specific location of the electronic circuitry, power supply, computer control and memory containing the instructional program steps used to carry out the edge grinding function is not necessary to gain an understanding of the invention. It suffices to say that the location of the various electronic and electrical components are done in accordance with acceptable engineering and production standards for such apparatus. For purposes of the present disclosure, it is taken that all the necessary control electronics and computer control and memory are contained within the printed circuit board 22.

A lens to be cut into the desired shape and edged is chucked at a lens chucking station generally designated 26 and which lens is held and rotated about the theta axis 25 with rotational driving force being applied to both surfaces of the lens when the lens is held in the chuck. Control of the clamp at the chucking station 26 is accomplished by operating a key on the keyboard 14. The apparatus comprising the lens chucking station is discussed in further detail below in FIGS. 2 and 3.

The lens chucking station 26 is carried on a platform or carriage generally designated 28 and which carriage is arranged for rectilinear movement along the R-axis in a direction indicated by the arrow 30. The R-axis carriage 28 travels along rails or ways 32, 34 which cooperate with pillow blocks, linear bearings or other assemblies well known to those skilled in the art. The carriage carrying assemblies may be connected to or fabricated as part of the underside 36 of the R-axis carriage 28. The R-axis carriage 28 is driven along the R-axis ways by two lead screws 38, 40 and associated cooperating ball nut assemblies 42, 44, respectively. The ball nut assembly 42 is mounted somewhat above the base of the R-axis carriage 28 and in the same plane as the lead screw 38. The ball nut assembly 44 is mounted to the underside 36 of the R-axis carriage 28.

The lead screw 38 is parallel to the surface of the R-axis carriage 28 and extends from the motor 46 in the R-axis direction toward the front of the apparatus. The lead screw 38 is coupled at one end to the R-axis motor 46 which drives the lead screw 38 causing the R-axis carriage 28 to move in one direction when the lead screw 38 is rotated in one direction and to move in the opposite direction when the lead screw 38 is rotated in the opposite direction. In order to prevent vibration of the R-axis carriage 28 during the lens cutting and edging operations the R-axis carriage is also driven by a second lead screw 40 cooperating with the ball nut assembly 44 and which screw 40 is rotated in unison with the lead screw 38 so that driving motion is applied to both the underside and the upper portion of the R-axis carriage 28. The lead screw 38 includes a drive pulley 50 connected at one end 52 of the lead screw and likewise, a drive pulley 54 is connected to one end 56 of the lead screw 40. A drive belt 48 travels about the drive pulleys 50 and 54 to transfer rotational power from the lead screw 38 and R-axis motor 46 to the lead screw 40.

The entire R-axis carriage 28 is carried on a Z-axis platform or carriage generally designated 58 and which moves in the Z-axis direction as indicated by the arrow 60. The Z-axis carriage 58 also rides on rails or ways 62, 64 using pillow blocks, linear bearings or other such assemblies. The Z-axis carriage 58 travels in a rectilinear direction perpendicular to the direction of movement of the R-axis carriage 28. A lead screw 68 is coupled to and driven by a Z-axis motor 66 and which screw cooperates with a ball nut assembly mounted to the underside 70 of the Z-axis carriage 58 to cause the carriage to move in the direction of arrow 60. The ball and nut assembly associated with the Z-axis carriage is not shown in the figure.

The apparatus 10 also includes a lens surface mapping station generally designated 72. Two surface probes 74, 76 each of which comprise a wheel attached to an encoder arm, are brought into contact with the front and rear surfaces respectively of a lens clamped in the lens chucking station 26 and are used to map the surface of the lens along the path substantially defining the lens shape as the lens rotates. The term mapping as used herein refers to and defines the process of determining a number of local points on the front and rear surfaces of a lens generally following along a path corresponding substantially to the peripheral outline shape of the lens opening in an associated eyeglass frame for which the lens is being edged and from which the surface profile of the lens is determined. The mapped data points define the displacement of the surface from an imaginary Z-axis reference plane substantially perpendicular to the Z-axis direction and parallel with a plane in the R-axis direction. The local edge thickness of the lens can be determined from the displacement measurements at one or more of the number of local points on the surface. In actuality, there is no physical Z-axis reference plane since all points are determined mathematically. Mapping may also be defined as motion in the Z-axis direction of the surface of the lens as the lens is rotated about an axis of rotation extending through the lens between the front and rear surfaces and the change in displacement between each point on the surface and the imaginary Z-axis reference plane.

The dimensional data that is determined by the surface mapping is utilized in the instruction set in the software program of the controller 21 to verify that there will be sufficient thickness at the peripheral edge of the cut lens to permit beveling and to insure that chipping or fracturing of the lens edge will not occur. The mapping also determines that the chosen lens blank is sufficiently large to accommodate the lens shape that is to be cut from the lens blank. The operation of the lens surface mapping is discussed in further detail below.

The apparatus 10 also includes a cutting station generally designated 78. The station 78 includes an axially elongated multi-insert cutter generally designated 80 which is carried on a cutter spindle 82 which is rotated about the spindle axis 27. The spindle 82 and cutter 80 are driven by a cutter motor 84 which is coupled to the spindle 82 via a belt 86 driving a pulley 88 attached to the spindle. The multi-insert cutter is explained in further detail below and includes sections for rough cut, finish cut, grooving and beveling.

A lens blank to be cut into the desired shape and edged is moved toward and away from the cutter in the R-axis direction to produce the desired shape. Each of the rough cut, finish cut, grooving and beveling operations are accomplished by moving the Z-axis platform to the appropriate sections on the multi-insert cutter and moving the R-axis platform toward and away from the cutter as the lens blank rotates to properly edge and finish the cut lens.

Figure 2:
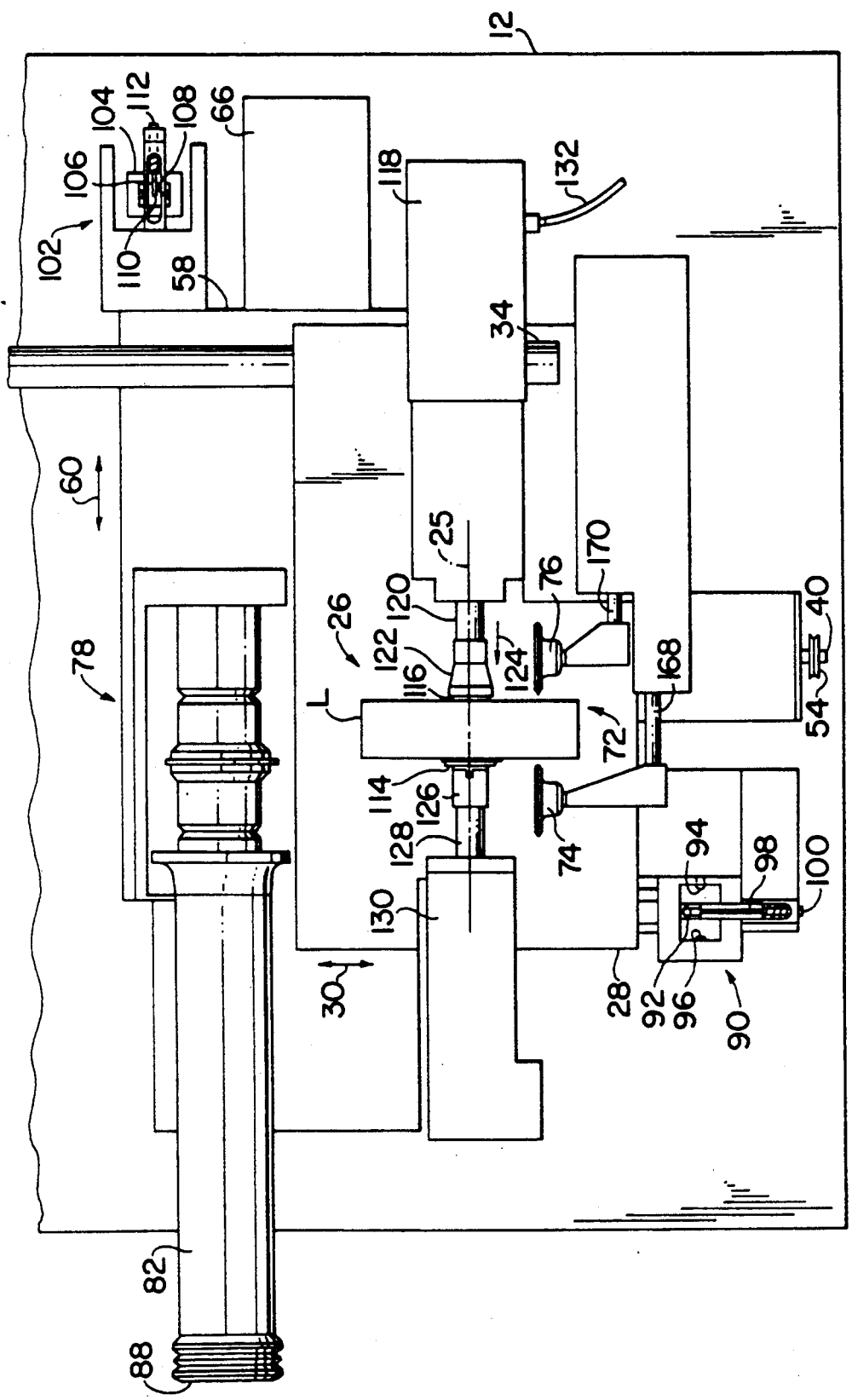
FIG. 2 is a top plan view of the lens edging apparatus of FIG. 1 illustrating the lens chucking station, lens surface mapping station and cutting station areas.

Turning now to FIG. 2, the movement and the displacement of the R-axis carriage 28 is made relative to a home stop position which is adjustable to provide a desired finished lens size adjustment. The home position sensor assembly for the R-axis carriage 28 is generally designated 90 and comprises an opto-electric sensor 92. The opto-electric sensor 92 includes an LED 94 and a photodetector 96 disposed opposite the LED 94. The opto-electric sensor 92 is of a type well known to those skilled in the art and is mounted to the base 12. A vane 98 is mounted to the underside of the R-axis carriage 28 and is positioned to interrupt the energy beam of the opto-electric sensor 92 and which interruption indicates that the R-axis carriage 28 is at the desired home position. The home position stop is micrometer adjustable by means of a screw adjustment generally designated 100 which moves the vane 98 to alter the position at which the energy beam of the opto-electric sensor 92 is interrupted thus changing the home stop position of the R-axis carriage 28 at the desired position to produce the required finished lens size. The displacement of the R-axis carriage 28 from its home position is approximately 4 inches and is driven by the R-axis motor 46 and two lead screws 38, 40 as stated above wherein the lead screws provide an advance of 0.2 inches per revolution and in combination with the R-axis motor 46 achieves 0.0005 inches per step, the R-axis motor 46 being a step motor.

The home position of the Z-axis carriage 58 is also adjusted by means of a home position sensor assembly generally designated 102 and which assembly is similar to the R-axis carriage home position sensor assembly 90. The Z-axis home position sensor 102 comprises an opto-electric sensor 104 which includes an LED 106 and a photodiode 108 disposed opposite the LED 106. The opto-electric sensor 104 is mounted to the base 12. A vane 110 is attached to the underside of the Z-axis carriage and interrupts the energy beam in the opto-electric sensor 104 to indicate that the carriage is at the home position. The location of the home position is micrometer adjustable by means of an adjustment screw 112 which moves the vane 110 in the Z-axis direction and the Z-axis carriage moves along the Z-axis relative to the cutting and edging station 78 in response to the adjustment. The Z-axis carriage is likewise controllable in increments of 0.0005 inches per step of the Z-axis steps motor 66.

A lens blank L is chucked at the chucking station between a leap block 114 and a felt pressure pad 116. An air cylinder 118 has a piston 120 which carries a pressure pad chuck 122 to which the felt pad 116 is attached. The lens blank L and leap block 114 are urged in the direction 124 by action of the piston 120 and the leap block 114 is brought into complementary and driving engagement with a collar 126 attached to the end of a lens drive spindle 128. The lens blank is held so that the edge of the lens is in a plane substantially perpendicular and transverse to a plane passing through and parallel with the axially elongated, multi-insert cutter 80.

The lens drive spindle 128 is carried by a transfer case 130. The lens rotation drive transfer system is discussed in greater detail in conjunction with FIG. 3. Air pressure is provided to operate the air piston via a pressure line 132 from an air regulator not shown. The air regulator is used to adjust the air pressure to vary the clamping force supplied by the piston 120 to the blocked lens blank L. The clamping piston 120 is toggled between an open and clamped position by using a key on the keyboard 14 which causes air to be applied to or discharged from the air cylinder 118.

Figure 3:
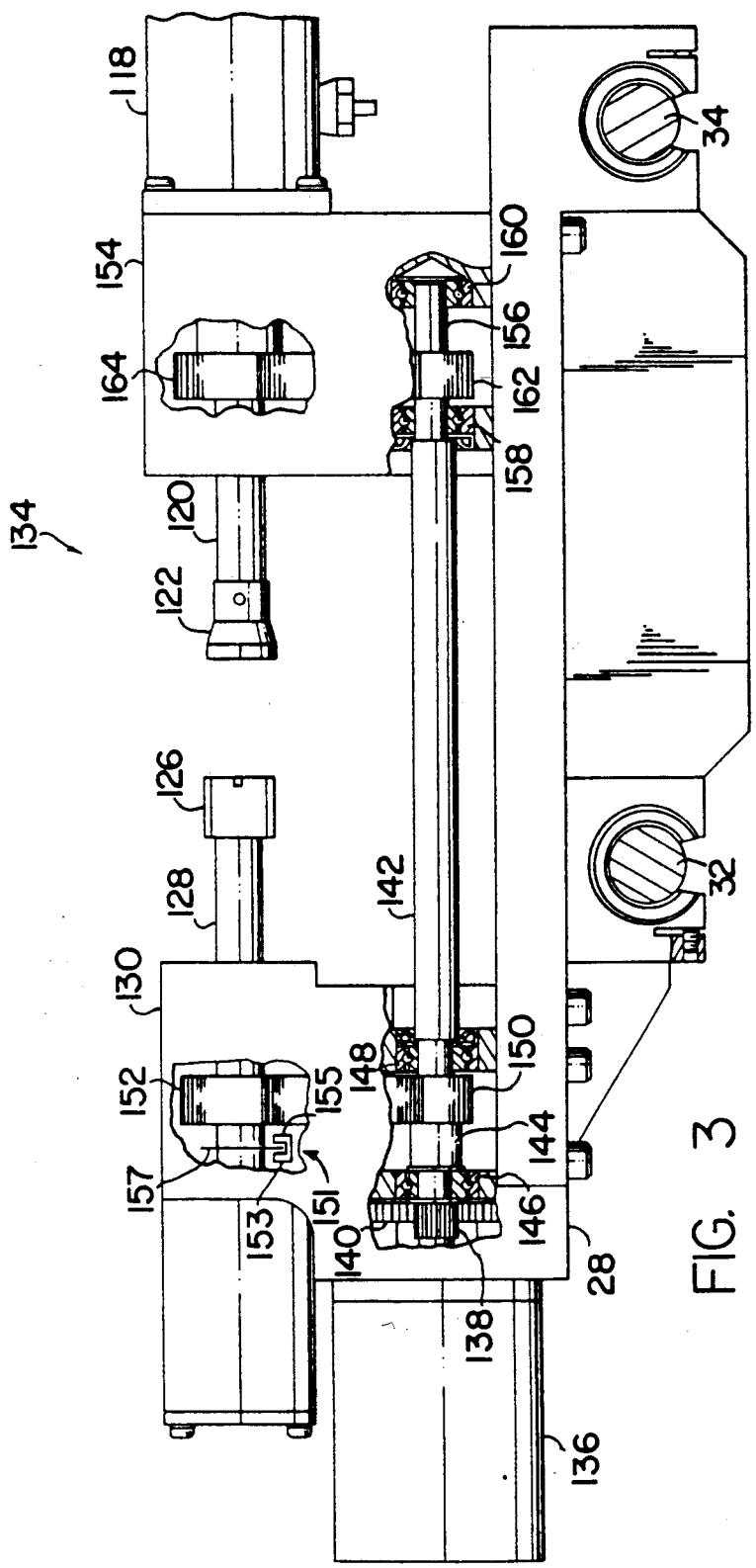
FIG. 3 is a front elevation view illustrating the lens rotation drive transfer system for rotating a chucked lens blank.

Turning now to FIG. 3, the lens rotation drive transfer system is illustrated therein and generally designated 134. The drive transfer system includes a theta drive motor 136 mounted to the R-axis carriage 28 and to the transfer case 130. The theta drive motor 136 is a step motor and has a drive gear 138 which is used to transfer rotational driving power to a drive gear 140 within the transfer case 130. The drive gear 140 is connected to one end of a torque shaft 142 which, as described below, transfers rotational power to the clamping piston 120 and lens drive spindle 128. One end 144 of the torque shaft 142 connected to the drive gear 140 is journaled in bearings 146, 148 and which bearings are mounted in the transfer case 130. A gear 150 is located within the transfer case 130 and is carried on the torque shaft 142 and engages with and imparts rotational movement to a gear assembly including a gear 152 also located within the transfer case and carried by one end of the lens drive spindle 128. The lens rotation drive transfer system includes a second transfer case 154 disposed opposite the transfer case 130 and to which transfer case 154 is mounted the air cylinder 118 and which carries the clamping system 120. The opposite end 156 of the torque shaft 142 is journaled in bearings 158, 160 which are included in the transfer case 154. A drive gear 162 is carried by the torque shaft 142 and imparts rotational driving motion to a gear assembly within the transfer case 154 part of which is a gear 164 which is carried on one end of the clamping piston 120. It can be seen that the lens rotational drive transfer system 134 provides synchronous rotational drive to both the lens drive spindle 128 and the clamping piston 120 when the theta drive motor 136 is activated. In the preferred embodiment, the gearing ratios are chosen to achieve a rotational resolution of 4,000 steps per revolution of the theta drive steps motor 136.

The home position of the theta drive motor and accordingly the lens drive spindle 128 and collar 126 which is carried on the drive spindle and engages with a leap block is sensed by an opto-electric sensor assembly generally designated 151. The assembly includes an LED 153 and photodetector 155 disposed opposite the LED. A disk 157 includes a radial slot and is mounted on the lens drive spindle 128 and interrupts the energy beam between the LED 153 and photodetector 155 at all positions except for the position where the energy beam passes through the slot in the disk which is taken to be the home position.

Figure 4:
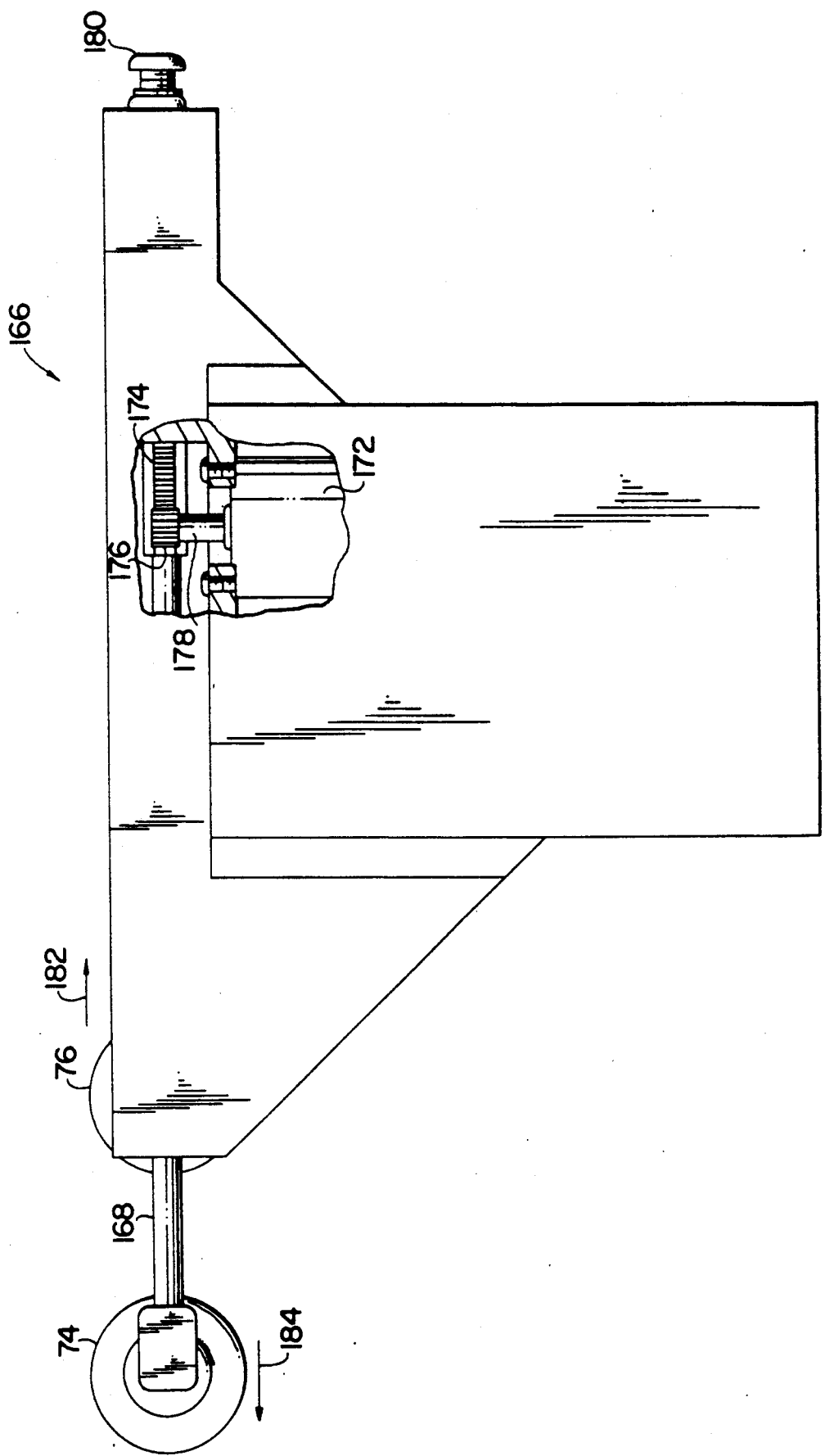
FIG. 4 is a front elevation view of the lens surface mapping assembly partially cut away to show the rack gear and rotary encoder associated with one arm which carries a surface probe.

Turning now to FIG. 4, a front elevational view of the lens surface mapping encoder assembly is illustrated therein and generally designated 166. The encoder assembly includes two surface probe mapping wheels 74, 76 each of which is carried by and on an encoder arm 168, 170 respectively (the encoder arm 170 is not shown in FIG. 4 and is best viewed in FIG. 2). A motor/encoder assembly is associated with each of the encoder arms and as illustrated in a partial cut away view of FIG. 4, such a motor/encoder assembly generally designated 172 is schematically illustrated therein. The encoder arm 168 includes a rack gear 174 mounted thereon and includes teeth which engage with a pinion gear 176 located on a shaft 178 associated with the motor/encoder 172. The encoder arm 170 likewise includes a rack gear mounted thereon and which includes teeth that engage with a pinion gear associated with its respective motor/encoder assembly. In their retracted position, the encoder arms and surface probe wheels are separated from one another with the encoder arm 170 carrying mapping wheel 76 being fully retracted in the direction indicated by arrow 182 such that the end of the encoder arm 170 moves against a hard stop and in which retracted position provides the initialization and home position for this arm. The home position is adjustable by means of a screw 180 which alters the position at which the hard stop is located. In the fully retracted position, the encoder arm 168 carrying the surface mapping wheel 74 is moved fully in the direction indicated by arrow 184. In the fully retracted position, the surface mapping wheels are safe from operator mishandling and interference with a lens blank to be chucked at the chucking station. Upon applying power, the surface mapping wheels 74 and 76 move toward one another into a fully extended position until such time as the wheels contact one another. In this extended position wherein the wheels come into contact with each other, the encoder associated with the encoder arm 168 is initialized. The encoder arms then retract to their home positions until such time as they are called into operation to map the surface of a lens blank.

Each of the surface mapping wheels 74, 76 are approximately 1" in diameter to accommodate the sharp step present in bifocal lenses so as to not catch on the step as the wheel travels along the surface of the lens blank. The encoder mechanism is similar to the encoding mechanism described in U.S. Pat. No. 4,724,617 assigned to the same assignee as the present invention. In the present invention, an optical encoder is mounted directly on the motor.

Figure 5:
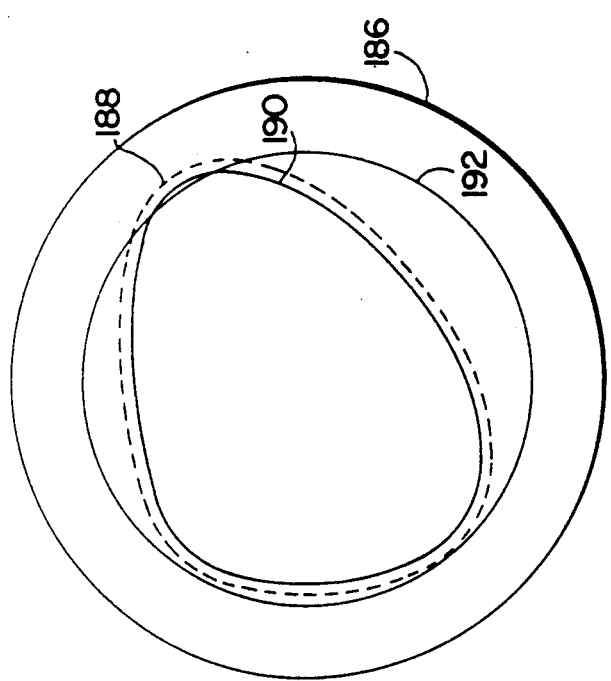
FIG. 5 is an illustration of the outline of a lens to be cut from an optical lens blank showing the surface mapping path located on the surface of two lens blanks, one blank of which is of insufficient diameter to accommodate the size of the desired lens.

A typical lens blank to be edged is illustrated in FIG. 5 and designated 186. (The lens blank 186 is designated "L" in FIG. 2). The lens blank 186 is chucked at the lens chucking station 26 and the surface mapping wheels 74, 76 come into contact with the respective surfaces of the lens blank. The path followed on the surface of the lens blank is indicated by the dashed line 188 in FIG. 5 and is in the shape of the desired lens to be cut. The path followed is in accordance with coordinate dimensional information characterizing the size and shape of the lens to be cut for the particular eyeglass frame opening to be fitted. Such dimensional data may be inputted directly to the edge grinder from a frame tracing apparatus such as that described in the U.S. Pat. No. 4,724,617 entitled "Apparatus for Tracing the Lens Opening in an Eye Glass Frame" or from any other source such as a computer memory or other storage media that has the appropriate characterizing data. Coordinate information from the above identified frame tracing apparatus is in the form of a number of radii lengths and associated angles for a predetermined number of positions defining the periphery of the associated lens opening and specifically provides 400 points along the periphery. The coordinate information is based on the standard boxing system of measurement.

The R-axis carriage 28, best viewed in FIG. 2, will move toward and away from the lens surface mapping station in the R-axis direction indicated by arrow 30 as the lens blank rotates about the theta axis 25. The surfaces of the lens are mapped at a 0.02" greater radius than the desired finished edge indicated by the solid line 190 in FIG. 5. The mapping at a radius greater than the finished edge dimension avoids creating scratches on the lens surface from the mapping wheels. If the lens blank is not sufficiently large to accommodate the size of the lens to be cut such as illustrated in FIG. 5 by a lens indicated by the line 192, an appropriate message will be displayed at the LCD display 16 located at the control entry module 18. These and other messages will be explained further below. The ability to map the shape of a lens before cutting minimizes the chance of error and substantially eliminates the guess work and trial and error methods of bevel placement, lens positioning for pin beveling, selection of the proper size blank to fill the frame opening and a determination as to whether the lens blank is too thin or too thick to be properly edged in accordance with the size and shape of the lens to be fitted to the eyeglass frame.

Figure 6:
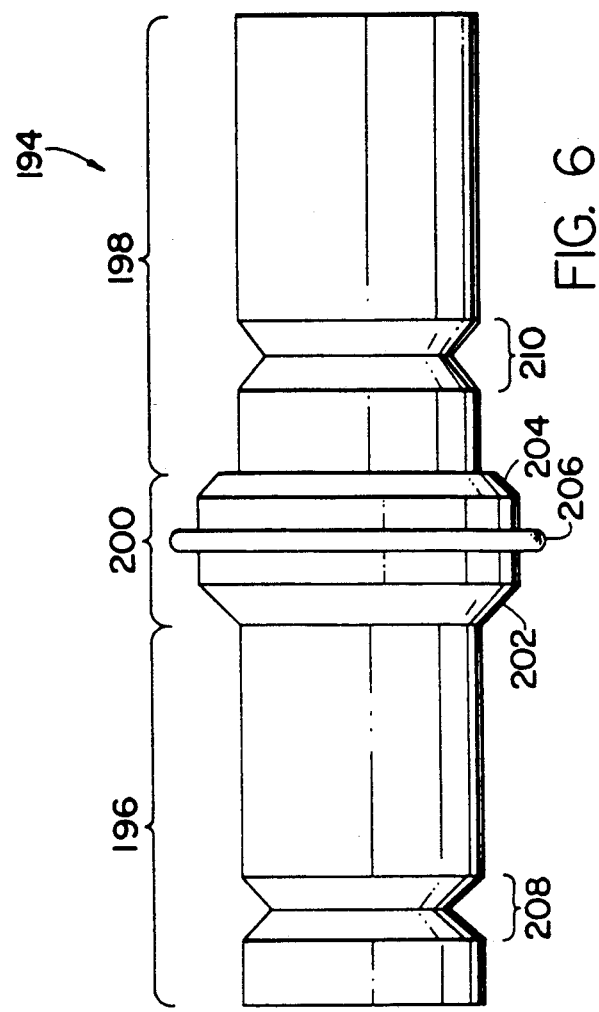
FIG. 6 is an enlarged view of a multi-insert cutter that may be used with the present invention for cutting, grinding, finishing, beveling and grooving the edge of a plastic optical lens.

The lens edging is accomplished by moving the R-axis carriage away from the operator and toward the cutter spindle carrying a multi-insert cutter such as illustrated in FIG. 6 and generally designated 194. The multi-insert cutter in the preferred embodiment is capable of edging and finishing lenses made from CR-39 or polycarbonate material. It will be understood that the edging apparatus embodying the present invention may accommodate any type cutter. In the illustrated multi-insert cutter of FIG. 6, the portion indicated 196 is made from carbide and is used to provide a rough cut for CR-39 material and for roughing and finishing polycarbonate material. The portion of the multi-insert cutter indicated 198 and 200 is an electroplated abrasive wheel containing a diamond grit coat in the preferred embodiment which is used for low material removal such as would be done in finishing lenses made from CR-39. The section of the multi-insert cutter indicated 200 is used for placing a pin bevel and for grooving. The portion indicated 202 is used to provide a back pin bevel and the portion 204 is used to provide a front pin bevel. The portion of the multi-insert cutter generally indicated 206 is used for grooving procedures to provide for mounting using wire or string. The multi-insert cutter 194 also provides V-bevels also referred to as a Hide-A-Bevel with a V-bevel form using a carbide material indicated 208 and abrasive material such as diamond grit and being indicated 210.

The lens blank to be edged is precisely and accurately positioned and moved toward and away from the cutter to produce the desired lens having the exact size and shape of the eyeglass frame to be fitted. The control of the placement of the lens is accomplished through a computer algorithm stored within the memory contained in the electronic circuitry. The algorithm utilizes the dimensional coordinate data characterizing the size and shape of the lens to be cut and that of the mapped surface together with the type of material prior to an operator beginning the edging process. The computer algorithm controls the relative movement of the lens blank in the R-axis direction toward and away from the cutter and the rotation of the chuck holding the lens blank at each appropriate section of the cutter to produce a relative motion between the cutter and lens blank to achieve a lens having a smoothly finished edge. The lens blank is moved to the appropriate sections of the cutter by movement of the R-axis carriage along the Z-axis.

Figure 7:
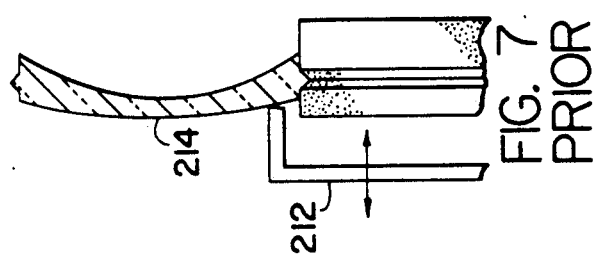
FIG. 7 illustrates a prior art edger having a free-float system wherein an adjustable stop mechanism regulates the distance that the lens bevel is ground from the front surface of the lens.

In contrast, a prior art edger having a free float system is illustrated in FIG. 7 wherein an adjustable stop mechanism 212 is used to regulate the distance that the lens bevel is ground from the front surface 214 of the lens. This prior art mechanism attempts to position the bevel a fixed distance behind the front surface of the lens. This distance must be manually set for each lens. The method is not suitable for many lenses which have large variations in edge thickness. In addition, changes in local slope of the front surface at various points around the finished lens result in different distances from the front surface to the bevel. It can be seen that a bevel placed with such a prior art mechanism may not be properly located for a given lens blank, lens size and shape.

Figure 8:
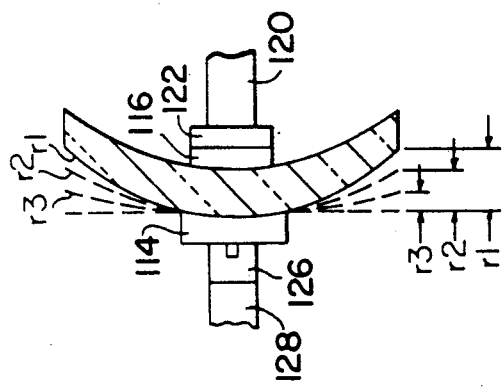
FIG. 8 is a schematic illustration of a chucked lens blank and shows that the bevel would move off the edge on non-circular lens shapes for larger lens having high base curves when the lens is locked in a stationary horizontal position.

FIG. 8 is a schematic illustration of a chucked lens blank and illustrates that the bevel would move off the edge on long corners for larger lenses having high base curves if the lens is not properly and accurately positioned during the edging process. The radius of curvature of the front lens surface is illustrated for radii $R_1$, $R_2$ and $R_3$ and each have a corresponding distance from the front surface of the lens of $D_1$, $D_2$ and $D_3$ respectively. Accordingly, it can be seen that a great deal of operator intervention is required to properly locate the lens blank for beveling since the placement of the bevel must be determined based on the size and shape of the lens to be beveled and further upon the base curve of the lens.

Figures 9A, 9B, 9C:
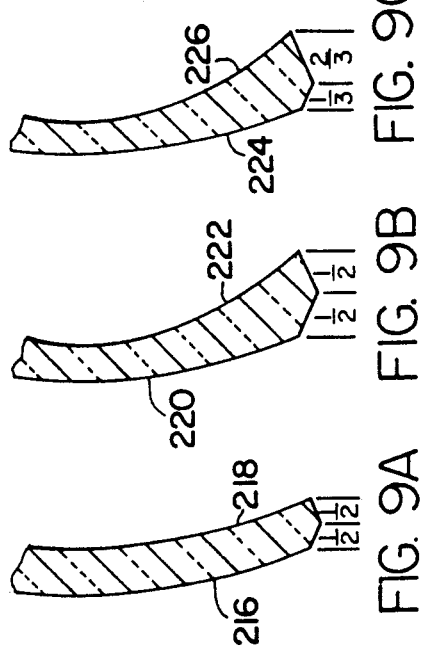
FIG. 9a illustrates schematically the bevel apex placement for a thin lens.
FIGS. 9b and 9c illustrate schematically the bevel apex placement for a thick lens with FIG. 9c illustrating the preferred placement.

FIGS. 9a, 9b and 9c illustrate several bevel placements and demonstrate in part the operator skill necessary with prior art to properly locate and place a bevel on a lens edge. In FIG. 9a, the lens is relatively thin and proper bevel placement is approximately midway between the front surface 216 and the rear surface 218. FIG. 9b illustrates a thicker lens wherein a bevel is placed midway between the front surface 220 and the rear surface 222. Such placement of the bevel in FIG. 9b is undesirable from a cosmetic standpoint because a lens inserted in a eyeglass frame will project in front of the frame and be cosmetically unattractive. The better and more preferable bevel placement for a thick lens is illustrated in FIG. 9c wherein the bevel is placed approximately ⅓ the distance from the front surface 224 and ⅔ the distance from the rear surface 226. It can be seen that bevel placement using prior art surface followers such as illustrated in FIG. 7 requires a very experienced operator to produce a properly and desirably edged and beveled lens. In contrast, the present invention eliminates the guess work and attendant operator skill since both the front and rear surfaces of a lens blank are mapped prior to cutting and the placement of the bevel is accurately determined and the lens is automatically and continually positioned during the beveling process as the lens rotates to ensure that the bevel is at the desired location regardless of the size, base curve and the shape of the lens.

Figure 10:
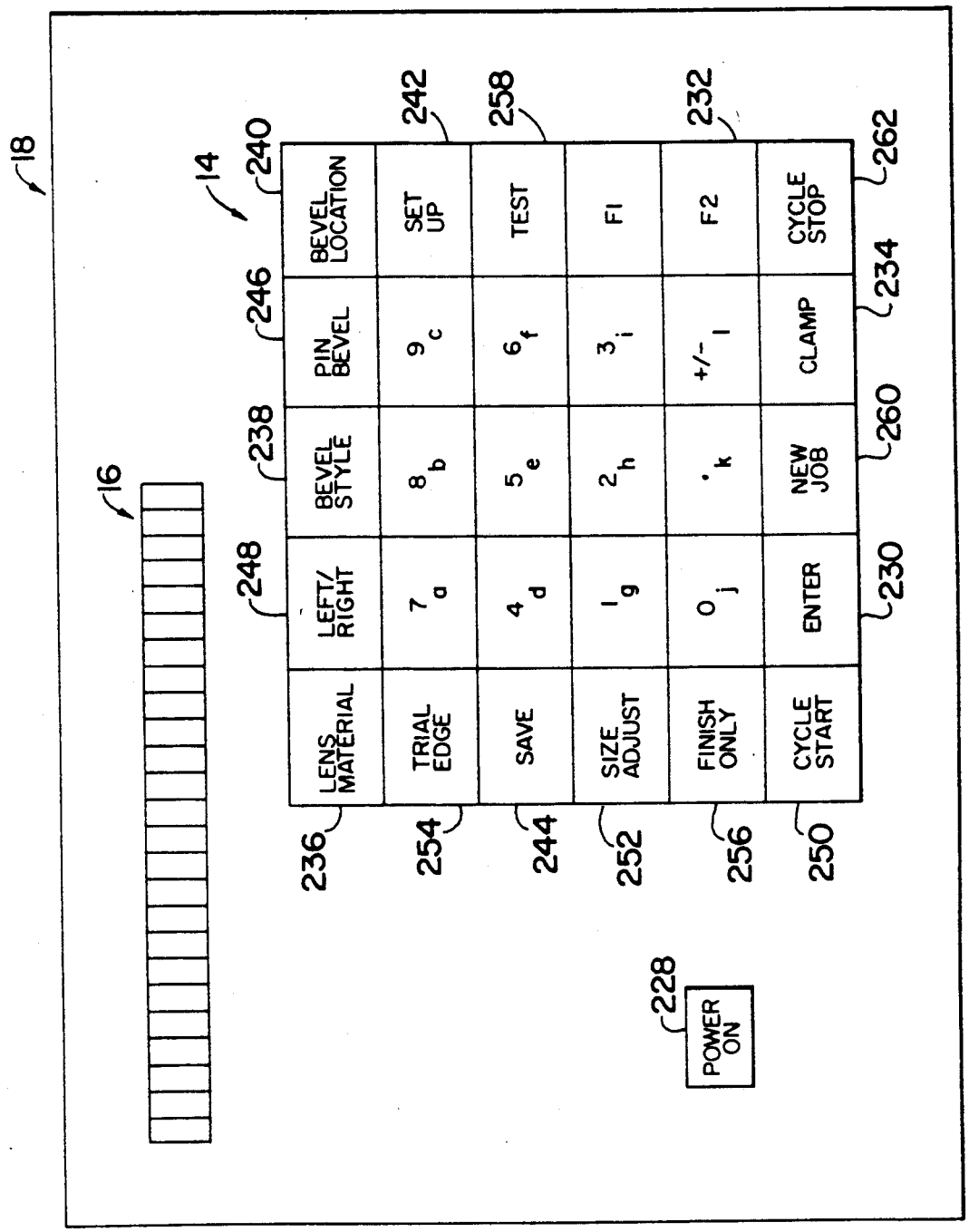
FIG. 10 illustrates in greater detail the LCD display and function key layout of the control entry module shown in FIG. 1.

Referring now to FIGS. 1 and 10, FIG. 10 illustrates in greater detail the function key layout of the control entry module 18 illustrated in FIG. 1 and to which function key layout is referred to in describing a typical lens edging operation utilizing the apparatus of the present invention. Upon operation of the POWER ON key 228, the apparatus is energized and causes a message to appear on the display 16 while the R, Z and theta axes initialize at their respective home positions and the lens surface mapping probes come into contact with one another and then retract to their home position as described above. At the completion of initialization, a message appears on the display 16 requesting input of a given job number or in the case where the dry edge grinding apparatus is connected to a frame tracing apparatus such as disclosed in U.S. Pat. No. 4,724,617, a message indicating "waiting for data" appears. In normal production operation, an operator will key in the job number via the numeric keys and then press the Enter key 230. The apparatus of the present invention may also accept characterizing data from any suitable source and via any conventional method such as bar code reading. The numeric keys are used to enter the job numbers and various setup parameters for the apparatus. The F2 key 232 is used when it is desired to enter alpha letters A–L rather than numbers.

Next, the right lens blank is installed at the clamping station and the chuck is closed by operating the CLAMP key 234. The CLAMP key is a toggle and pressing the key again causes the chuck to open. An edging cycle may only be started if the chuck is closed and when an edging cycle is in progress, the chuck cannot be opened.

After job data is received, the display will indicate the selected material. To change the selected material, the LENS MATERIAL key 236 is operated until the desired material is indicated in the display. The lens edging apparatus will automatically set up the proper speed and feed rates for the material selected.

The next step is to select the bevel style and this is accomplished by operating the BEVEL STYLE key 238. Each operation of the BEVEL STYLE key 238 will toggle through the bevel styles available and in the present invention include Hide-A-Bevel, rimless without groove and rimless with groove.

The next step is to determine the placement of the bevel and the BEVEL LOCATION key 242 is operated to toggle through the preset bevel locations available to the operator. The default bevel locations available to the operator are displayed after each operation of the BEVEL LOCATION key 240 and include placement 33% back from the front of the lens but not greater than 2 millimeters, a fixed distance of 1.5 millimeters back from the front of the lens, 50% back from the front of the lens edge, i.e., center of lens, edge diopter based bevel fitted to the lens edge, and an auto-bevel placement in which the distance back from front face is controlled in accordance with the local thickness of the lens edge where the percentage back depends on local thickness. The default settings are easily changed by pressing the SETUP key 242 which allows the operator to enter new numbers for the bevel placement. It is possible to save the new selection as a default configuration by operating the SAVE key 244. If it is not desirable to save the new configuration as a default configuration, operation of any key other than the SAVE key will exit the setup mode.

The next step is the selection of the pin bevel desired and the choices available are accessed by operating the PIN BEVEL key 246. Each operation of the PIN BEVEL key 246 will cause the choice to be displayed and the choices available include front pin bevel, rear pin bevel, front and rear pin bevel and no pin bevel. The desired choice is selected by operating the ENTER key 230. The amount of pin beveling is preset to 0.3 millimeters but is easily changed by operation of the SETUP key 242 and entry of the desired numeric values using the numeric keys. Again, the new configuration can be saved as a default configuration by operating the SAVE key 244. If it is not desired to save the new configuration, operation of any other key exits the setup mode.

The LEFT/RIGHT key 248 toggles the selection between the right and left lenses and is active only when the edging cycle parameters are displayed (lens material selection). In normal operation, the first lens to be edged is generally the right one and the lens edging apparatus is preset to expect the right lens. After the right lens is edged, the apparatus automatically switches to the left lens which eliminates any necessity of operator intervention. However, there may be instances where the operator wishes to edge the left lens first and this is done by operating the LEFT/RIGHT key 248.

The next step in edging a lens is to operate the CYCLE START key 250 after the access door or cover is closed. Upon operation of the CYCLE START key, the shape of the lens is mapped as described above and it is during this mapping operation that the apparatus determines whether the blank is large enough to fill the frame opening, whether it is too thin or too thick and makes other determinations such as positioning for pin beveling, etc.. At the conclusion of the mapping operation, a message is displayed if there is anything unusual about the job and the messages available include "lens too small" which might require changing to a larger blank or decentering the lens if possible; "lens too thin" which might include changing the lens blank or overriding and pressing the CYCLE START key again; "lens too thick" which might require changing the lens blank or overriding and pressing the CYCLE START key again, and "radius too small" indicating the pattern is too small to be cut with the edger. In the "lens too small" and the "radius too small" conditions, it is not possible to override the setting and operation of any key returns the apparatus to its home position.

If there are no unusual problems detected, the lens blank will be edged and finished including bevel location, pin bevel and finishing. Upon completion of the edging process, the CLAMP key 234 is operated to release the chuck and the left lens is inserted and clamped in the chuck by operation again of the CLAMP key 234. The CYCLE START key 250 is operated and the left lens is edged and finished.

In some instances it may be desirable to adjust the diameter or circumference of the finished lens. The default size adjustment is reset to zero each time a new job is entered in to the apparatus unless the SAVE key 244 was used to change the default parameter. An example of an instance where it might be desirable to provide a larger diameter for a good fit is in the case of a zyl frame. This is accomplished by operating the SIZE ADJUST key 252 until the display indicates DIAMETER ADJUST. At this point, the SETUP key 242 is operated and the desired adjustment is entered via the numeric keys and pressing the ENTER key 230 will cause the apparatus to edge the lens at the selected dimensional oversize in diameter. If the SAVE key 244 was pressed, all subsequent lenses would be edged with the oversized diameter until the size adjust parameter was again altered.

The same procedure is followed in adjusting the circumference. To access the circumference adjustment, the SIZE ADJUST key 252 is operated until the display indicates CIRCUMFERENCE ADJUST. As in the case of diameter adjustment, the dimensional data is entered via the keyboard and the ENTER key 230 is operated.

The edging apparatus of the present invention also permits a lens blank to be edged with a trial edge. This is accomplished by operating the TRIAL EDGE key 254 when the edging cycle parameters are displayed (lens material selection), and after the CYCLE START key 250 is operated and edging begins, the display 216 indicates TRIAL EDGE RIGHT or TRIAL EDGE LEFT and the lens diameter is edged 2 millimeters oversize. The trial edge function might be used to edge a lens if there is some question concerning the traced data, for example, if the edge quality is rough, there is still sufficient material left to retrace and edge the same lens again.

The edging apparatus of the present invention can perform an additional finish cut after a full edging cycle is completed. This feature is accessed by operating the FINISH ONLY key 256. When this feature is selected, the lens surfaces are not remapped. The finish only function might be used for example, when the operator decides to make a size adjustment or change from a rimless to a bevel edge.

Another feature of the edging apparatus of the present invention is its ability to operate in a test mode to verify and confirm that the apparatus is operating properly. The test mode is selected by operating the TEST key 258. In the test mode, 3 different shapes including round, square and oval are generated and the test patterns are toggled by operation of the TEST key. When the desired test pattern is indicated in the display it is selected by operating the ENTER key 230. The apparatus is returned to its normal operation and the test pattern mode is exited by operation of the NEW JOB key 260. The edging cycle may be immediately terminated by operating the CYCLE STOP key 262. The CYCLE STOP key 262 is operated to abort an edging cycle at any time and includes stopping rotation about the theta axes and backing out the R-axis and turning off power to the spindle drive motor.

Apparatus for edging an optical lens blank to provide a lens having a desired edge finish and configuration has been presented above in several embodiments. It will be understood, however, that numerous modifications and changes may be made by those skilled in the art without departing from the scope and the spirit of the invention. Therefore, the invention has been described by way of illustration rather than limitation.

We claim:

1. Apparatus for edging an optical lens blank having front and rear surfaces and a thickness into a lens having the size and shape of a lens opening in an eyeglass frame, said apparatus comprising:

means for providing a plurality of data points collectively representative of the peripheral size and shape of the lens opening in an associated eyeglass frame for which the lens is being edged;

a lens chucking station;

means for chucking the lens blank at said lens chucking station;

means for rotating the lens blank chucked at the chucking station, said lens blank being rotated about a rotation axis;

cutter means for edging the lens blank and forming a bevel or groove feature in the periphery of the finished lens;

means for independently translating the chucked lens for relative movement in two axes with respect to said cutter, one axis being substantially radial relative to said axis of rotation of the chucked lens, said one axis being defined as the R-axis, and a second axis being substantially parallel to said axis of rotation of the chucked lens, said second axis being defined as the Z-axis, and means for containing an instruction set to control said apparatus to provide continuous path control of said relative movement of said chucked lens along said R-axis and said Z-axis and relative to said rotation axis of the chucked lens in accordance with said plurality of data points and the curvature of the lens surfaces to engage the edge of the lens blank in the cutter and edge a lens having the size and shape of the lens opening in the associated eyeglass frame with the bevel or groove feature positioned on the periphery of the finished lens.

2. Apparatus for edging a lens blank as defined in claim 1 wherein said cutter means includes an abrasive grinding means.

3. Apparatus for edging a lens blank as defined in claim 1 further including means for mapping the front and rear surfaces of the lens blank at a plurality of positions along a path corresponding substantially to the peripheral outline shape of the lens to determine the profile of the front and rear surface of the lens, said plurality of positions collectively representing mapping data and corresponding to at least a portion of said data points which collectively represent the size and shape of the lens opening in the associated eyeglass frame.

4. Apparatus for edging a lens blank as defined in claim 3 wherein the position of the chucked lens blank relative to the cutter along the Z-axis is controlled in accordance with said mapping data to position the bevel or groove feature on the periphery of the finished lens.

5. Apparatus for edging a lens blank as defined in claim 4 wherein the position of the bevel or groove feature is controlled to be behind the front surface of the lens by a fixed percentage of the local edge thickness.

6. Apparatus for edging a lens blank as defined in claim 5 wherein the distance of the bevel or groove behind the front surface is further limited to a fixed maximum.

7. Apparatus for edging a lens blank as defined in claim 4 wherein the position of the bevel or groove feature is controlled to be a fixed distance behind the front surface of the lens.

8. Apparatus for edging a lens blank as defined in claim 4 wherein the position of the bevel or groove feature is controlled in accordance with the local thickness of the lens edge to be a percentage of the thickness behind the front surface of the lens where the percentage is determined from and related to the local thickness.

9. Apparatus for edging a lens blank as defined in claim 4 wherein the position of the bevel or groove feature is controlled to be on a spherical surface which intersects the edge of the finished lens.

10. Apparatus for edging a lens blank as defined in claim 1 wherein said cutter includes a plurality of cutting portions for chamfering or pin beveling the lens corners defined by the intersection of the finished edge with the front and rear surfaces of the lens.

11. Apparatus for edging a lens blank as defined in claim 3 wherein said cutter includes a plurality of cutting portions for chamfering or pin beveling the lens corners defined by the intersection of the finished edge with the front and rear surfaces of the lens, and wherein the axial position of the chucked lens blank relative to one of said plurality of cutting portions for producing one of a front and rear pin bevel is controlled in accordance with the mapping data corresponding to one of said front and rear surfaces of the lens to produce a safety chamfer or pin bevel on said front and rear surfaces.

12. Apparatus for edging a lens blank as defined in claim 3 wherein said mapping means further includes surface mapping wheels disposed opposite one another and at either side of the chucking station whereby the front surface and rear surface of a lens blank at the chucking station is contacted by a respective one of said mapping wheels when said mapping means is activated, said surface mapping wheels having a circumference lying in a plane substantially perpendicular to and transverse with a plane passing through and parallel with the surfaces of the lens blank at the point of contact between each respective surface mapping wheel and the lens surface;

encoder arms carrying said surface mapping wheels and arranged for rectilinear motion toward and away from the chucking station and in substantially the same plane as the chucking station, and a number of motor/encoder assemblies each of which is associated with a respective encoder arm for urging said encoder arm along a rectilinear path toward and away from the chucking station and for measuring incremental movement as the surface mapping wheel travels along the surface of a lens blank being rotated at the chucking station.

13. Apparatus for edging a lens blank as defined in claim 1 further including said cutter means comprising an axially elongated multi-insert cutter having a plurality of cutting sections each section of which performs one edging operation in a group of edging operations, said group of edging operations including cutting, beveling, pin beveling, grooving and polishing.

14. Apparatus for edging a lens blank as defined in claim 1 wherein each of said data points is a radius and an associated angle whereby a number of such radii and associated respective angles characterize the size and shape of said lens cut from said lens blank.

15. Apparatus for edging a lens blank as defined in claim 3 further including means in said instruction set for using the mapped data of a lens blank to determine if the lens blank to be edged is too small, too thin or too thick to produce a satisfactory edged lens.

16. A method for edging an optical lens blank having front and rear surfaces and a thickness into a lens having the size and shape of a lens opening in an eyeglass frame, said method comprising the steps of:

providing a plurality of data points collectively representative of the peripheral size and shape of the lens opening in an associated eyeglass frame for which the lens is being edged;

chucking the lens blank for rotation about a rotation axis, said rotation axis passing through the lens blank transversely to the front and rear surface;

rotating the chucked lens blank about said rotation axis;

edging the lens blank with a cutter and forming a bevel or groove feature in the periphery of the finished lens;

independently translating the chucked lens for relative movement in two axes with respect to said cutter, one axis being substantially radial relative to said axis of rotation of the chucked lens, said one axis being defined as the R-axis, and a second axis being substantially parallel to said axis of rotation of the chucked lens, said second axis being defined as the Z-axis, and programming an edging apparatus with an instruction set to control said apparatus to provide continuous path control of said relative movement of said chucked lens along said R-axis and said Z-axis and relative to said rotation axis of the chucked lens in accordance with said plurality of data points and the curvature of the lens surfaces to engage the edge of the lens blank in the cutter and edge a lens having the size and shape of the lens opening in the associated eyeglass frame with the bevel or groove feature positioned on the periphery of the finished lens.

17. A method for edging a lens blank as defined in claim 16 further including the step of mapping the front and rear surfaces of the lens blank at a plurality of positions along a path corresponding substantially to the peripheral outline shape of the lens to determine the profile of the front and rear surface of the lens, said plurality of positions collectively representing mapped data and corresponding to at least a portion of said data points which collectively represent the size and shape of the lens.

18. A method for edging a lens blank as defined in claim 17 wherein the step of mapping is completed prior to edging the lens blank.

19. Apparatus for edging an optical lens blank having front and rear surfaces and a thickness into a lens having the size and shape of a lens opening in an eyeglass frame, said apparatus comprising:

means for providing a plurality of data points collectively representative of the peripheral size and shape of the lens opening in an associated eyeglass frame for which the lens is being edged;

means for chucking the lens blank for rotation about a rotation axis, said rotation axis passing through the lens blank transversely to the front and rear surfaces;

means for rotating the chucked lens blank about said rotation axis;

cutter means for edging the lens blank and forming a bevel or groove feature in the periphery of the finished lens, and means for providing relative movement in a radial and a transverse direction between said chucked lens and said cutter means in accordance with an instruction set as the chucked lens rotates relative to said cutter to track the edge of the lens on a portion of the cutter and to make a lens having the size and shape of the lens opening in the associated eyeglass frame and corresponding to said plurality of data points.

20. Apparatus for edging an optical lens blank having front and rear surfaces and a thickness into a lens having the size and shape of a lens opening in an eyeglass frame, said apparatus comprising:

means for providing a plurality of data points collectively representative of the peripheral size and shape of the lens opening in an associated eyeglass frame for which the lens is being edged;

means for chucking the lens blank for rotation about a rotation axis, said rotation axis passing through the lens blank transversely to the front and rear surfaces;

means for rotating the chucked lens blank about said rotation axis;

cutter means for edging the lens blank and forming a bevel or groove feature in the periphery of the finished lens;

means for providing relative movement in a radial and a transverse direction between said chucked lens and said cutter means as the chucked lens rotates relative to said cutter to track the edge of the lens on a portion of the cutter and to make a lens having the size and shape of the lens opening in the associated eyeglass frame and corresponding to said plurality of data points, and means for mapping the front and rear surfaces of the lens blank at a plurality of positions along a path corresponding substantially to the peripheral outline shape of the lens to determine the profile of the front and rear surface of the lens, said plurality of positions collectively representing mapping data and corresponding to at least a portion of said data points which collectively represent the size and shape of the lens opening in the associated eyeglass frame.

* * * * *